(12) United States Patent
Talanis (10) Patent No.: US 7,539,144 B2
(45) Date of Patent: *May 26, 2009

(54) DETERMINISTIC COMMUNICATIONS SYSTEM

(75) Inventor: Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 658 days.

This patent is subject to a terminal disclaimer.

(21) Appl. No.: 10/545,303

(22) PCT Filed: Jan. 27, 2004

(86) PCT No.: PCT/EP2004/000685

§ 371 (c)(1),
(2), (4) Date: Aug. 11, 2005

(87) PCT Pub. No.: WO2004/073261

PCT Pub. Date: Aug. 26, 2004

(65) Prior Publication Data

US 2006/0083176 A1 Apr. 20, 2006

(30) Foreign Application Priority Data

Feb. 12, 2003 (DE) ................. 103 05 828

(51) Int. Cl.
*H04L 1/16* (2006.01)

(52) U.S. Cl. .................................... 370/238

(58) Field of Classification Search ............... 370/487, 370/393, 394, 474, 389, 493, 352, 465, 222, 370/252, 299; 710/25, 23, 28; 714/12, 51, 714/707, 731, 775, 744; 709/229, 235; 705/65
See application file for complete search history.

(56) References Cited

U.S. PATENT DOCUMENTS

| 5,706,278 | A * | 1/1998 | Robillard et al. | 370/222 |
| 6,577,631 | B1 * | 6/2003 | Keenan et al. | 370/394 |
| 6,820,142 | B2 * | 11/2004 | Hofstee et al. | 710/25 |
| 2002/0064157 | A1 * | 5/2002 | Krause | 370/393 |

FOREIGN PATENT DOCUMENTS

| DE | 100 58 524 A1 | 6/2002 |
| WO | WO 2004/030275 A1 | 4/2004 |

OTHER PUBLICATIONS

Ethernet Powerlink™ bekannt (http://www.ethernet-powerlink.com/forum/inde.php?language=US and http://www.br-automation.com/presss/archiv/2002 12/AT/B&R 2002 12 AT.pdf). , Dec. 2002, pp. 1-11.

L. Lo Bello and O. Mirabella, "Design and Implementation of Real-Time Switch for Segmented Ethernets", Emerging Technologies and Factory automation, 2001 Proceedings of 8th IEEE International Conference, vol. 1, pp. 213-221.

(Continued)

*Primary Examiner*—Chi H Pham
*Assistant Examiner*—Alexander Boakye (57) ABSTRACT

The invention relates to a deterministic communications system comprising data sources, which can be connected to a data sink by means of at least one coupling node. Said system comprises a means of controlling the data sources to achieve a planned, deterministic communication between said data sources and the data sink.

12 Claims, 5 Drawing Sheets

OTHER PUBLICATIONS

Baek-Young Choi, Sejun Song, N. Birch and Jim Huang, "Probabiistic Approach to Switched Eterhnet for Real-Time Control Applications", 2000 Proceedings of Seventh International Conference on Real-Time Computing Systems and Applications, Abstract, p. 384.

S. Rüping, E. Vonnahme and J. Jasperneite, "Analysis of Switched Eterhnet Networks with different Topologies used in Automatin Systems", Proceedings of Fieldbus Conference, Magdeburg, Germany, Springer-Verlag, Sep. 1999, pp. 351-358.

C. Venkatramani and Tzi-Cker Chiueh, "Design Issues for Eterhnet in Automation", Network Protocols, 1997 Proceedings International Conference, Oct. 28-31, 1997, p. 152-161.

R. L. Cruz, "A Calculus for Network Delay, Part I: Network Elements in Isolation", IEEE Trans. on Information Theory, 37 (1); Jan. 1991, pp. 114-131.

Chitra Venkatramani and Tzi-Cker Chiueh, "Design and Implementation of Real-Time Switch for Segmented Ethernets", 1997 Proceedings International Conference, Oct. 28-31, 1997, p. 152-161.

Lucia Lo Bello and Orazio Mirabella, "Design Issues for Eterhnet in Automation", Network Protocols, Emerging Technologies and Factory Automation, 2001 Proceedings of 8th IEEE International Conference, vol. 1, pp. 213-221.

Rene L. Cruz, "A Calculus for Network Delay, Part I: Network Elements in Isolation", IEEE Trans. on Information Theory, vol. 37, No. 1, Jan. 1991, pp. 114-131.

\* cited by examiner

DETERMINISTIC COMMUNICATIONS SYSTEM

CROSS REFERENCE TO RELATED APPLICATIONS

This application is the US National Stage of International Application No. PCT/EP2004/000685, filed Jan. 27, 2004 and claims the benefits thereof. The International Application claims the benefits of German application No. 10305828.1 filed Feb. 12, 2003, both applications are incorporated by reference herein in their entirety.

FIELD OF THE INVENTION

The invention relates to a deterministic communication system, especially for use in automation technology, as well as to a data source and to a project planning system for a real-time-capable deterministic communication system.

SUMMARY OF THE INVENTION

For implementing deterministic real-time communication in an automation system It is known from the prior art that particular hardware support can be provided for the communication user. For example this type of so-called isochronous RealTime-Fast-Ethernet (IRTE) is known from DE 100 585 24.

In real-time communication with an IRTE there is a IRT time area (IRT-Z.) in the isochronous cycle and an NRT time area (NRT-Z., Non Real-Time). The cyclic exchange of real-time data takes place in the IRT time area, whereas in the NRT time area communication uses standard Ethernet communication. The NRT time area is especially suited to transmission of data from lower-performance algorithms.

Corresponding data networks are formed from a number of network data nodes and allow communication between a number of subscribers. Communication here means the transmission of data between the subscribers. The data to be transmitted in this case is sent as data telegrams, which means that the data is packed into one or more packets and sent in this form over the data network to the appropriate recipient. The term data packet is thus also used. The term transmission of data is used in this document fully synonymously with the above-mentioned transmission of data telegrams or data packets.

For networking in such swichable high-performance data networks, especially Ethernet, the subscribers are interlinked via switches. Each switch can be connected to more than two subscribers and can also be a subscriber itself. Subscribers are for example computers, Programmable Logic Controllers (PLC) or other machines which exchange electronic data with other machines and especially process it.

In distributed automation systems, for example in the area of drive technology, specific data must arrive at specific times at the intended subscribers and must be processed by the recipients. This is referred to as realtime-critical data or real-time-critical data traffic since, if the data does not arrive at its intended destination at the right time, this can produce undesired results at the subscriber.

The use of a synchronous clocked communication system with equidistant characteristics (isochronous communication system) in an automation system is also known from the prior art. This is taken to mean a system consisting of at least two subscribers that are linked via a data network for the purposes of mutual exchange of data or mutual transmission of data.

In this case data is exchanged cyclically in equidistant communication cycles (isochronous cycles) which are specified by the communication clock used by the system. Subscribers are for example central automation devices, e.g. Programmable Logic Controllers (PLC) or other control units, computers or machines which exchange electronic data with other machines and process data, especially from other machines and peripheral devices, e.g. input/output modules, drives, actors, sensors. In this document control units are taken to mean closed-loop controllers or control units of all types. Typical examples of communication systems used for data transmission are bus systems such as Field Bus, Profibus, Ethernet, Industrial Ethernet, FireWire or also PC-internal bus systems (PCI), etc.

Real-time communication involves planned communication. In such systems data telegrams are forwarded via predetermined ports at fixed points by a subscriber. A real-time receive node also expects real-time data packets at a specific time at a specific port. The path that the real-time telegram takes in the system is thus defined precisely by planning of the isochronous real-time communication. During a communication cycle the complete image of the periphery is exchanged in a node. The image of the periphery includes all real-time critical data which is sent, received and stored by a subscriber in a specific address area of a memory. The entire address area is overwritten during a cycle.

A disadvantage of such previously known real-time communication systems is that dedicated hardware support for the subscriber of the communication system is required for implementing the real-time capability, i.e. for a planned and deterministic sequence of communication.

In addition there are different approaches to providing a so-called Switched Ethernet with real-time capabilities:

The use of micro segmentation to create a quasi-deterministic communication system which is more or less suitable for real-time communication is known from S. Rüping, E. Vonnhame, J. Jasperneite, "Analysis of Switched Ethernet Networks with Difference Topologies Used in Automation Systems", in Proc. of Fieldbus Conference (FeT '99), Magdeburg, Germany, P. 351-358, Springer-Verlag, September 99. The disadvantage in this case is especially the large number of switches required for the micro segmentation.

Priority-based approaches and approaches to smoothing the communication traffic for improving the real-time capabilities of the Switched Ethernet are further known from "Design and Implementation of Real-Time Switch for Seamented Ethemets", Venkatramani, C.; Tzi-cker Chiueh; Network Protocols, 1997, Proceedings 1997International Conference on, 28-31 Oct. 1997, pages 152-161. Especially through the smoothing of the communication traffic the number of attempts or retransmissions for successful transmission of a frame is to be reduced. The smoothing of the communication traffic is to be achieved in this approach through a leaky bucket-based algorithm, as is known from R. L. Cruz, "A Calculus for network delay, Part I: Network elements in Isolation", IEEE Trans. on Information Theory, 37(1):114-131, Jan. 1991.

Furthermore the ETHERNET Powerlink TM is known from the prior art (http://www.ethernet-powerlink.com/forum/index.php?language=US and http://www.br-automation.com/press/archive/2002 12/AT/B&R 2002 12 AT.pdf). In this case a hub-based approach is involved, with the disadvantage that this imposes limits on the data transmission rates. Furthermore full-duplex point-to-point data connections are also not possible.

From "Probabilistic Approach to Switched Ethernet for RealTime Control Applications", Baek-Young Choi; Sejun Song; Birch, N.; Jim Huang; Real-Time Computing system and Applications, 2000. Proceedings. Seventh International Conference on, 2000, pages 384-388, an access method to Switched Ethernet based on a statistical likelihood is known, with which the real-time capability of the Ethernet is to be improved.

A cyclic communication method is known from "*Design Issues for Ethernet in Automation*", Lo Bello, L.; Mirabella, 0.; Emerging Technologies and Factory Automation, 2001. Proceedings. 2001 8th IEEE International Conference on, 2001, Pages 213-221, Vol. 1, in which communication is undertaken in each cycle in accordance with an order of priorities.

The disadvantage of these previously-known approaches for improving the real-time capability of the Ethernet is that this method does not offer sufficient security, especially for industrial automation systems.

The object of the invention is thus to create an improved real-time-capable communication system which is especially suitable for use in industrial automation systems. A further object of the invention is to create a corresponding data source, a project planning system and digital memory media for such a real-time capable communication system.

The objects underlying the invention are achieved in each case with the features of the independent patent claims. Preferred embodiments of the invention are specified in the dependent patent claims.

in accordance with the invention, the data sources of a communication system, especially of a Switched Ethernet, are controlled so that a planned, deterministic data transmission from the data sources to one or more data sinks takes place. On the basis of the planned, deterministic data transmission a real-time-capable communication system is created, since because of the planning and the determinism of the data transmission on the basis of the corresponding control of the data sources it is guaranteed that probabilistic states are securely avoided and thereby specific data is received at specific points in time by the data sink or data sinks. Communication in this case is undertaken using coupling nodes (known as "switches"). This avoids the disadvantages of hub-based approaches.

In accordance with a preferred embodiment of the invention the deterministic data transmission is planned so that competing communication requirements of the data sources are avoided. This has the advantage that for example competing attempts to access the data sources on the bus or the switches do not arise and that the transmission of a frame is not interrupted as is known for example with Switched Ethernet systems of the prior art. This especially also has the advantage of not leading to the formation of queues.

In accordance with a preferred embodiment of the invention, the data sources are controllers for a planned, deterministic data transmission and the data sink or data sinks are end nodes. For example further data sources can be connected to the data sources which for their part do not have to feature any such control. In this case a real-time-capable segment of the communication system is formed by the end points. Such a segment can also contain a number of coupling nodes, known as hops.

In accordance with a further preferred embodiment of the invention, each data source at an end node has a memory with description data for the planned, deterministic data transmission from the data source to the data sink. This description data can for example be created by a project-planning system. Such project-planning systems for real-time-capable automation systems are already known per se for the design of IRTE system and are commercially available from Siemens AG.

Alternatively or additionally such description data for control of the data sources is determined by an automatic determination of the topology of the communication system, the characteristics of the switches involved and the time and volume requirements of the application entities. A method suitable for this is for example the Single Service Discovery Protocol (SSDP).

In accordance with a further preferred embodiment of the invention, synchronization means for synchronization of the data sources are provided for implementing the planned, deterministic data transmission. Such synchronization can for example be undertaken with aid of tokens or a round-robin method or also through time bases of the individual data sources synchronized to each other.

In accordance with a further preferred embodiment of the invention, communication gaps are provided in the planning of the deterministic data transmission. The advantage of this is that further data transmission can be undertaken in the gaps independently of the planned, deterministic data transmission. In this manner mobile network nodes can be added or removed without the project having to be replanned.

In accordance with a further preferred embodiment of the invention, self-diagnoses of the system are undertaken at predefined intervals. In the self-diagnosis the access from mobile nodes is synchronized. Preferably the interval for the self-diagnosis is given by the longest maximum cycle.

In accordance with a further preferred embodiment of the invention the control of the data sources for the planned, deterministic data transmission is implemented by a software module in the data sources. Preferably this is compatible with the Microsoft Windows bandwidth reservation system, as implemented from Windows 2000 onwards, and has the form of a policy module.

Of particular advantage with the present invention is the fact that it makes it possible to set up a real-time-capable communication system which is suitable for industrial automation systems on the basis of standard Switched Ethernet components, with these only having to be supplemented by a software module. Of particular advantage is also the fact that the standard Switched Ethernet-components can be used in the optimum way because of the inventive control of the data transmission, since no resources have to be used up for competing communication accesses, queues and such like.

Preferred embodiments of the invention are shown in more detail below with reference to the diagrams.

DETAILED DESCRIPTION OF THE INVENTION

Figure 1:
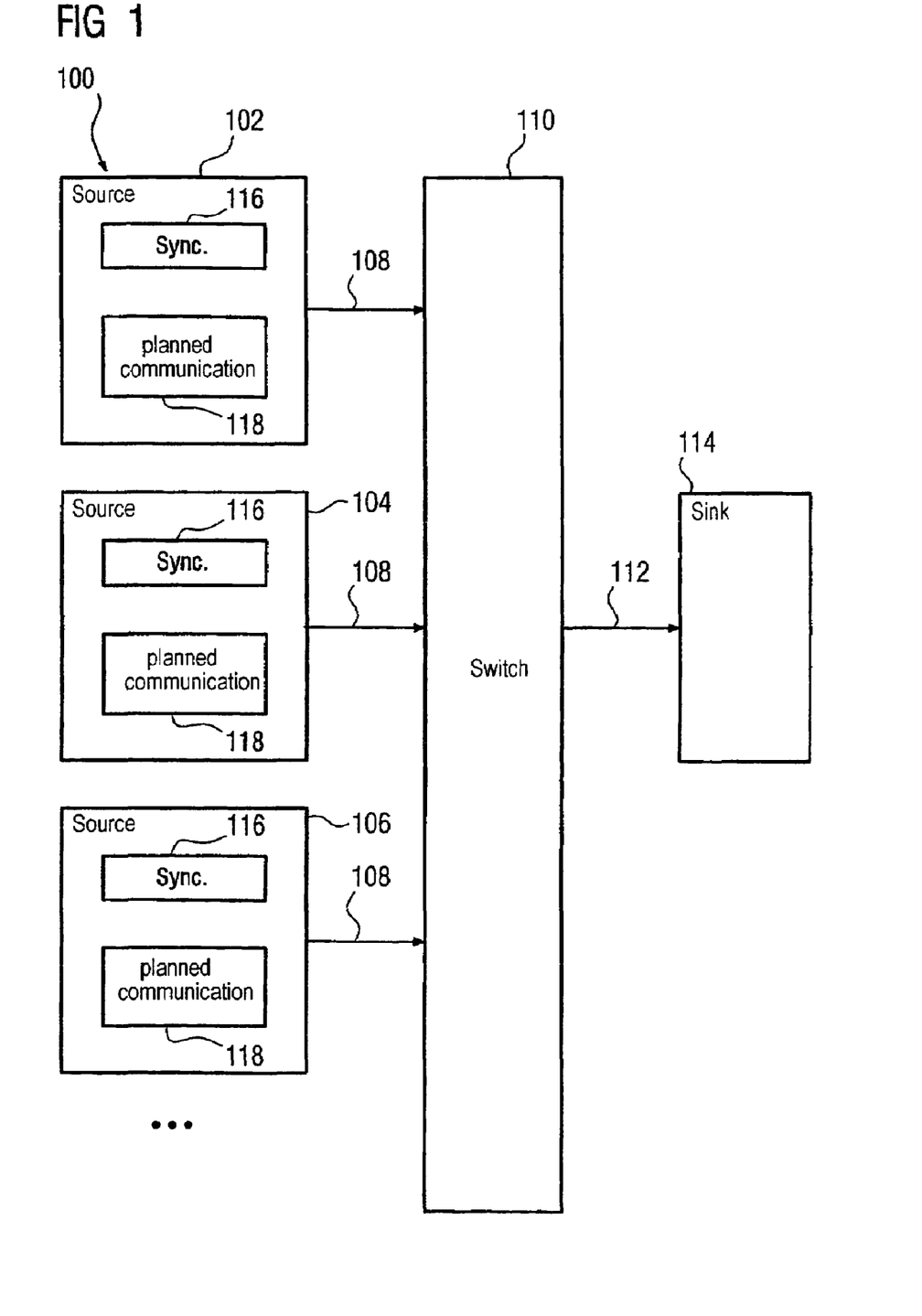
FIG. 1 shows a block diagram of a embodiment of a real-time-capable communication system in accordance with the invention.

FIG. 1 shows a deterministic communication system 100 with data sources 102, 104, 106, ..., which are connected via normal Ethernet cables 108 to a switch 110.

The switch 110 is connected via an Ethernet cable 112 to a data sink 114.

The data sources 102, 104, 106, ..., the switch 110 and the sink 114 are preferably standard components which are used in a Switched Ethernet. The data sources 102, 104, 106, ..., can for example be Programmable Logic Controllers (PLC), a SCADA (supervisory control and data acquisition) system or a field bus peripheral device for a SCADA system. Depending on the system status, a data source 102, 104, 106, ... can also function as a data sink and vice versa.

In a practical application a number of coupling nodes—known as hops—are further arranged between a data source and a data sink. Preferably in this case the communication system 100 is used for controlling an industrial automation system, especially for packaging machines, presses, plastic injection-molding machines, textile machines, printing machines, machine tools, robots, woodworking machines, glass processing machines, ceramics processing machines and lifting gear.

The data sources 102, 104, 106, ... are based on standard Ethernet components and are "refined" by the additional software modules 116 and 118. The module 116 is used in this case for synchronization between the data sources 102, 104, 106, .... To do this different synchronization methods known per se can be employed. For example the synchronization can be implemented by a cyclic token method or by time bases synchronized with each other.

Each of the modules 118 holds a description file for the planned, deterministic data transmission of the corresponding data source to the data sink 114. The communication is planned in this case so that at no time is an overload of a subscriber of the communication system 100 ever produced, i.e. especially not competing communication requirements and queues for access to the switches 110 or the data sink 114.

As a result of this type of planning the communication is also determined, since the otherwise normal Ethernet access methods based on the random principle are avoided as a result of the stringent planning of communication. As a result of this preconfiguration of the data transmission in the Switched Ethernet segment considered the reaction time of the communication system for a specific data transmission is pre-defined:

On the one hand the maximum switch delay time, i.e. the propagation delay of the data transmission caused by the switch 110 is known; This time is predetermined for each switch and the different modes of operation of a switch, i.e. store-and-forward or cut-through for example, the number of ports, priority etc. This time corresponds to the time that a bit of any given port needs at any given time from in-port to out-port.

On the other hand the communication of data sources through the project planning, i.e. the control of the data sources for a planned, deterministic data transmission e.g. with regard to bandwidth, sequence and message length, is predetermined. This is especially achieved by the project planning of the Switched-Ethernet segment in question including the entire message traffic in this segment in order to guarantee that at no time is a subscriber of this segment overloaded. It follows from this that the reaction time of the system between two end nodes, that is between one of the data sources and the data sink 114, can be calculated using the following formula:

Number of hops*maximum switch delay+cable delay

If for example in a Switched Ethernet segment the reaction time between the data source 102 and the data sink 104 is to be computed, and if the number of hops between the data source 102 and the data sink 114 is 10 and there is a total of 1000 meters of cable, the reaction time produced is 1000*5 ns (cable delay)+10×120 us (delay through the 10 switches for worst case store-and-forward)+10×5 us (switch through-connection time)=1.255 ms.

Figure 2:
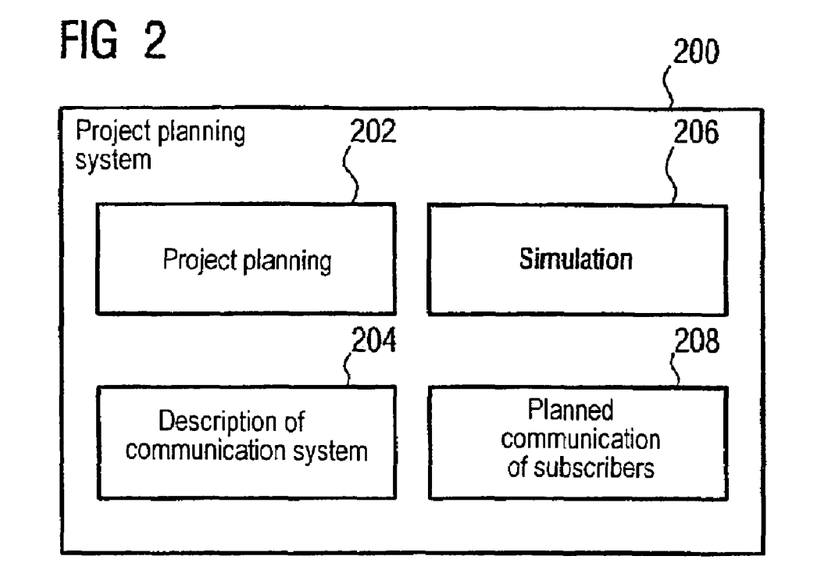
FIG. 2 shows a block diagram of a project planning system for generating description files for the planned, deterministic data transmission.

FIG. 2 shows a block diagram of a project-planning system 200 such as can be used for generating the description files for the module 118 of the data sources 102, 104, 106, ....

The project planning system 200 has a module 202 for input of project-planning data. Further the project-planning system 200 has an image 204 of the previously planned communication system. A module 206 of the project-planning system 200 is used to execute a simulation to check the correctness of the planned communication system.

The project planning is undertaken such that at no point is one of the subscribers of the communication system overloaded, so that probabilistic, i.e. non-deterministic system statuses do not arise as is otherwise the case in Switched Ethernet communication systems. Planning the project in this way in particular prevents competing accesses to system resources arising with the formation of queues and such like.

Further the project-planning system 200 has a module 208 to generate description files for the module 118 (cf. FIG. 1) of the data sources 102, 104, 106, ... The generation of such description files which are specific for the data sources involved has the advantage that a complete image of the communication system does not have to be stored in each data source.

Figure 3:
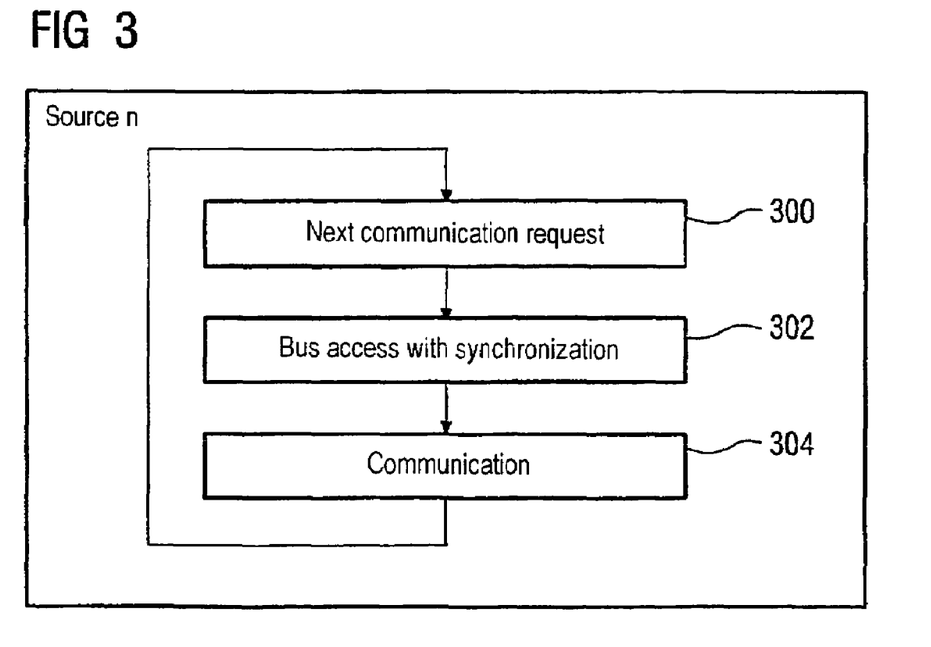
FIG. 3 shows a flowchart to shown the basic mode of operation of a data source of the real-time-capable communication system.

FIG. 3 illustrates the principal mode of operation of a data source n in a communication system in accordance with invention with planned, deterministic communication. In step 300 the data source fetches the next communication request from its description file. After this, in step 302 there is a bus access which is undertaken synchronized with the other data sources so that simultaneous access from a number of data sources does not arise. The bus access in step 302 thus securely results in the handling of the desired communication in step 304. From there the sequence control returns to step 300. Principally the same process is executed in this case parallel in time in the other data sources of the communication system. The synchronization is for example established by synchronous time bases of the data sources.

Figure 4:
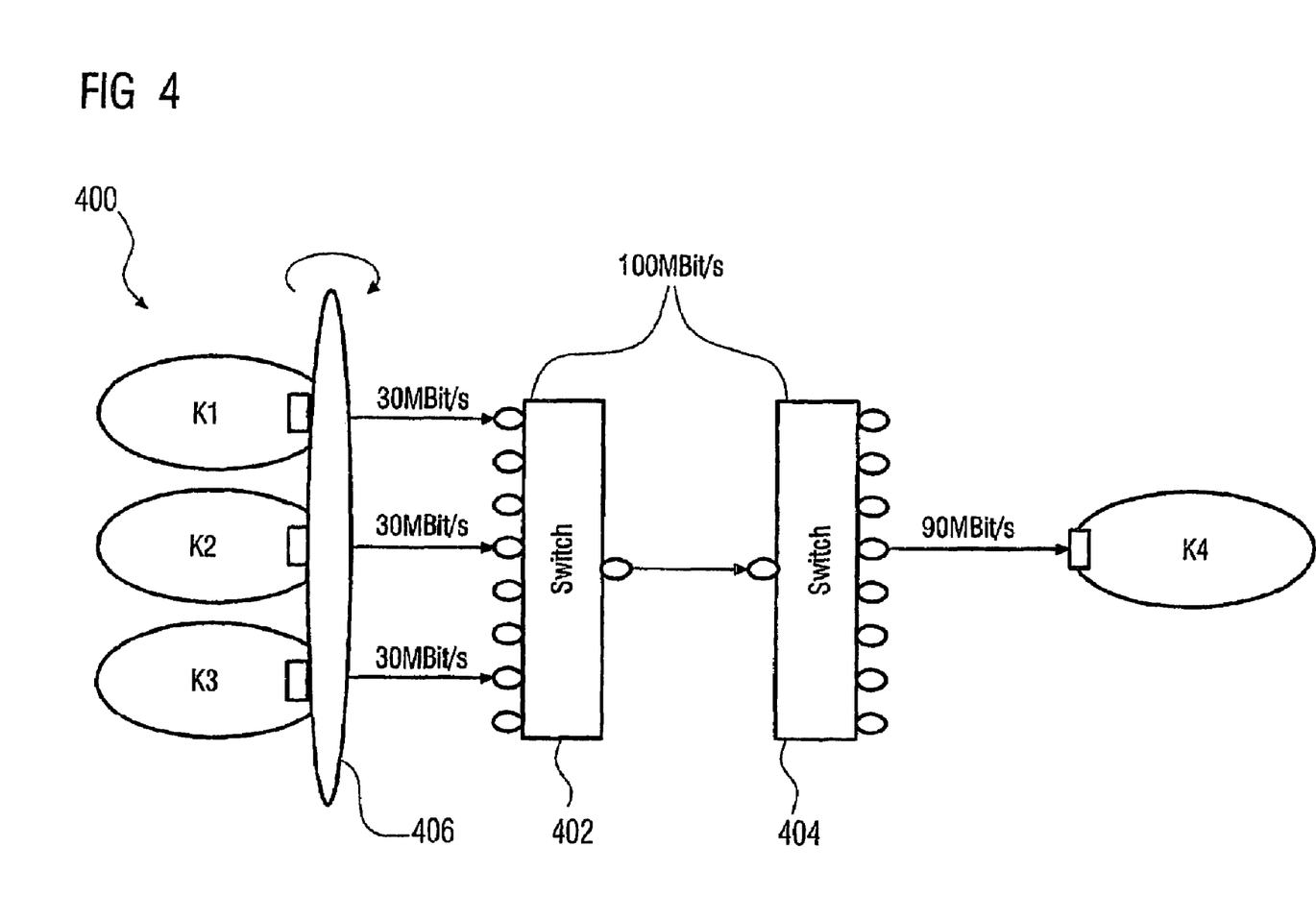
FIG. 4 shows a block diagram of a further preferred embodiment with a cyclic token method for synchronization of the data sources.

FIG. 4 shows a further embodiment of an inventive communication system 400. The communication system 400 has data sources K1, K2, K3 and one data sink K4. The data sources K1, K2 and K3 are connected to each other via switches 402 and 404.

For example each of the switches 402, 404 has a transmission capacity of 100 MBit/s. The data sources K1, K2 and K3 are by contrast connected with an average maximum data rate of 30 MBit/s to the switch 402. The data sources K1, K2 and K3 are synchronized with each other in the send direction by a cyclic token method 406 so that competing accesses to the switch 402 or the switch 404 do not arise. In this case it is sufficient for the immediate end nodes, i.e. the data sources K1, K2 and K3, to be synchronized in the send direction; such a synchronization is not required for an nodes which may be upstream from the data sources K1, K2 and K3.

The token method—or also any other synchronization method—defines the maximum delay time of the switch in one direction.

The projected transmit and receive specification in the individual data sources K1, K2 and K3 also guarantees that the execution of the communication is not only planned, but also deterministic, since for example, as a result of project planning, it is ensured that at no point is a subscriber overloaded and thus a non-planned state cannot arise. If one of the data sources K1, K2 or K3 establishes a communication connection via the switches 402 and 404 to switch 404 at a specific point in time, for this time of the access a guaranteed data rate of 90 MBit/s is available.

Figure 5:
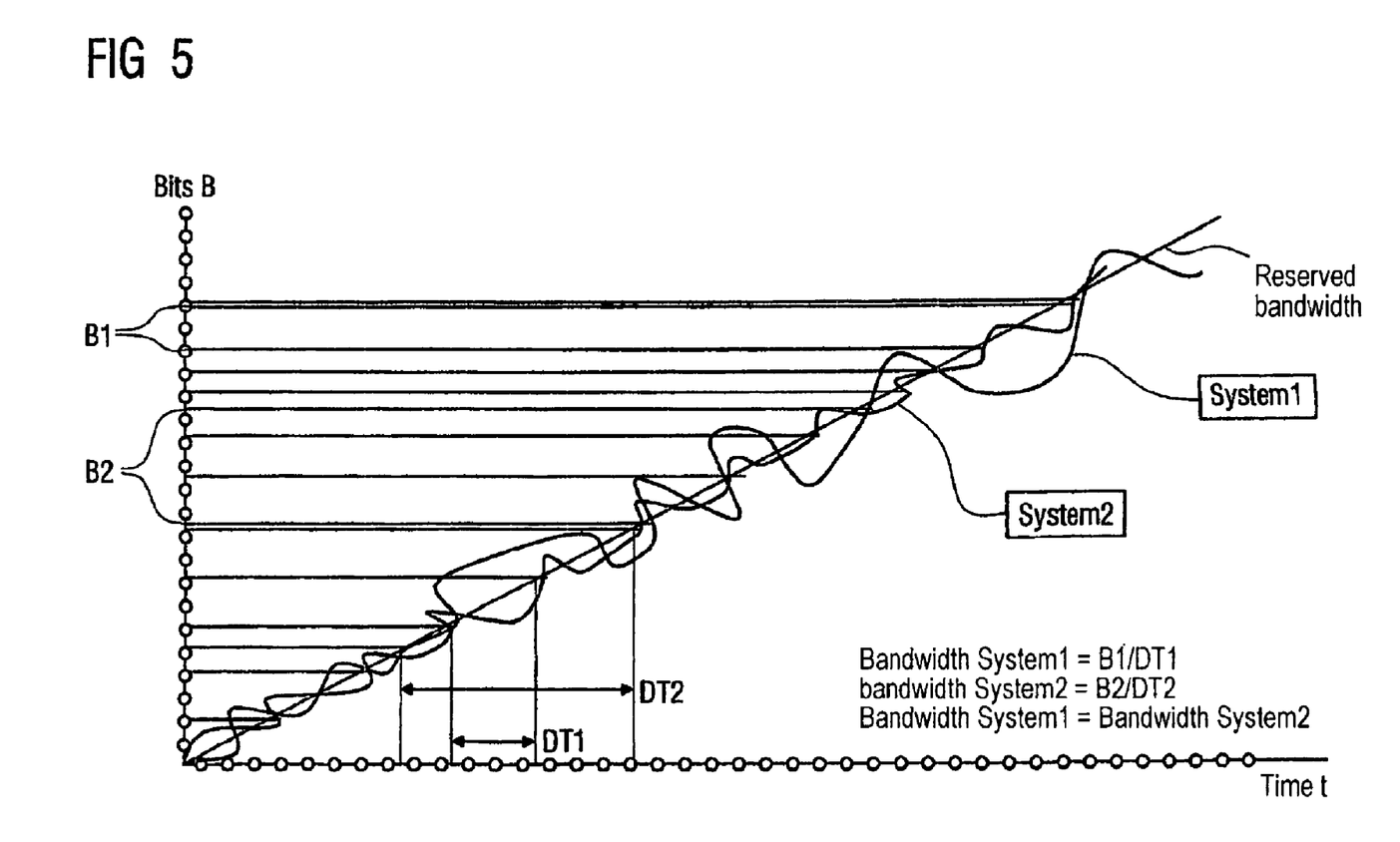
FIG. 5 shows a graphical presentation of the quality of a deterministic communication system based on its reaction time.

FIG. 5 shows a graphical presentation of the quality, i.e. the bandwidth, of an Ethernet communication system, with systems 1 and 2 being compared with one another.

For example system 1 produces in cycle DT1 and system 2 produces in cycle DT2. The subsequent derivation reveals that system 1 produces three times as quickly as system 2 and that this is related to the data volume B1, since the communication in system 1 corresponds more to the linear ideal state ("reserved bandwidth"):

The maximum time interval DT of the guaranteed bandwidth (Bits/DT) between any two nodes K1 and K2 of a deterministic Switched-Ethernet communication system defines its reaction time. The graphical presentation of FIG. 5 shows the following:

1. In the time T=a*(DT1+DT2) communication system 1 has transmitted B=a*(B1+B2) bits.
2. In the time T=a*(DT1+DT2) communication system 2 has transmitted B=a*(B1+B2) bits.
3. DT2=3*DT1.
4. At time T=a*(DT1+DT2) in the future: Communication system 1 can transfer B1 bits guaranteed in the DT1 time, while communication system 2 for B1 bits (worst case) needs 3*DT1 time.

It follows from this that: The reaction time of communication system 1 is three times as fast as that of communication system 2.

5. The communication system 1 (communication system 2) can cyclically transfer B1 (B2) bits guaranteed in the cycle DT1 (DT2).

It follows from 4 and 5 that the (production) cycle of a communication system is defined by its reaction time.

It further follows from this that a cyclic production system P1 (e.g. a packaging machine) which uses communication system 1 as a medium for synchronization of its peripherals (e.g. writing to the outputs and reading from the inputs), can produce three times as fast as if it were to use communication system 2.

A communication request for a planned, deterministic communication thus preferably contains a precise specification of the bits to be transmitted and of the time available for the transmission instead of a global specification of the average data rate as is otherwise normal in the prior art.

Figure 6:
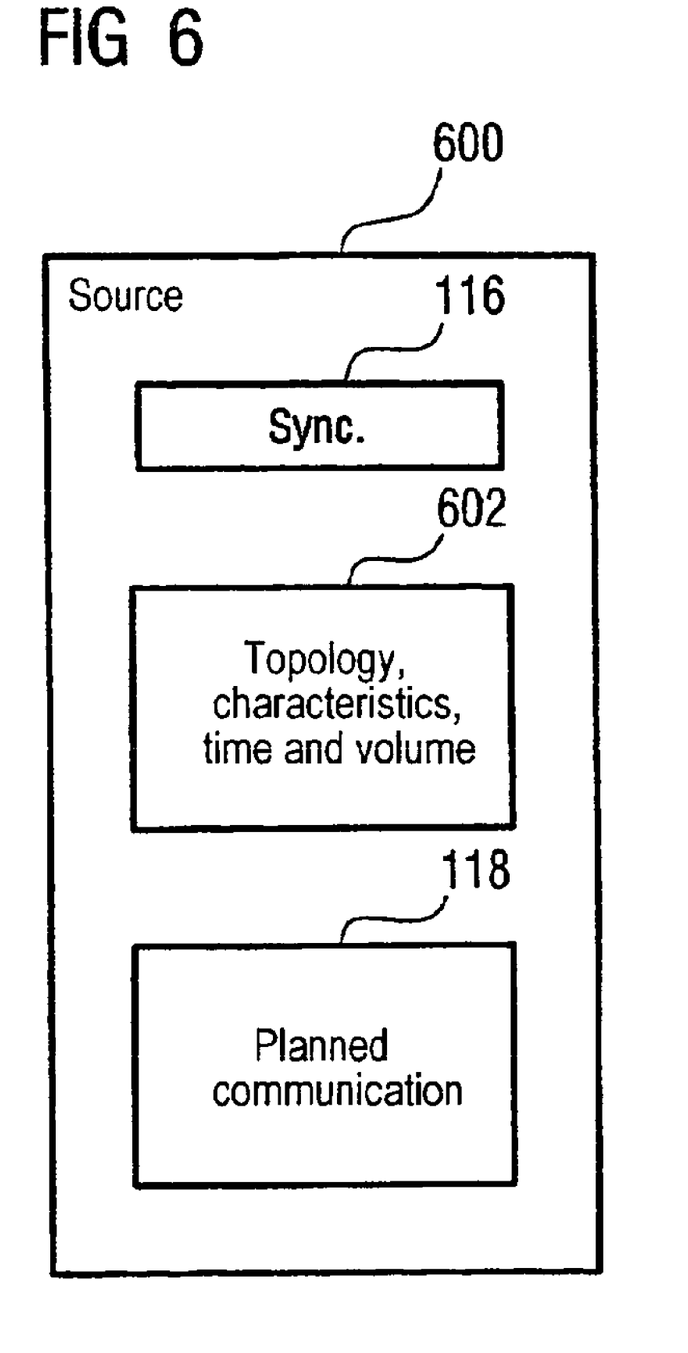
FIG. 6 shows a block diagram of a data source with an automatic determination of the topology.

FIG. 6 shows a further embodiment of a data source 600. Like the data sources 102, 104, 106, ... of the communication system 100 of FIG. 1 the data source 600 has modules 116 and 118. Unlike in the communications system 100 of FIG. 1, the description file for the module 118 is however not or not completely supplied by an external project-planning system but by the module 602 of the data source 600.

In the initialization of the communication system The module 602 requests the network topology and further determines the characteristics of system subscribers, especially of switch delays of the switches and such like. The corresponding data can be present in the subscribers themselves in the form of self—describing data sheets in the XML format.

The module 602 also queries the time and volume requirements of application entities of the relevant subscribers of the communication system. On the basis of this database and/or a supplementary databases which has been made available by the project-planning system, the final description file for the planned communication is then generated, which serves as a basis for the control of the data transmission by the module 118.

The invention further comprises:

A data source for a deterministic communication system (100;400), with the deterministic communication system (100;400) featuring a number of data sources (102, 104, 106, ... ; K1, K2, K3; 600) which are connected via at least one Switched Ethernet switch (110; 402, 404) to a data sink (114; K4), with the data source (102, 104, 106, ... ; K1, K2, K3; 600) featuring means (118) to control the data source or a planned, deterministic communication from the data source (102, 104, 106, ... ; K1, K2, K3; 600) to the data sink (114; K4).

A data source, with the means (118) for control of the data source (102, 104, 106, ... ; K1, K2, K3; 600) for a planned, deterministic communication being embodied so that competing communication requests of the data sources are avoided.

A data source, where the means (118) for control of the data source for a planned, deterministic communication are embodied so that the formation of queues as a result of communication requests from the data sources is avoided.

A data source, with synchronization means (116) for synchronization of the planned, deterministic communication with the further data sources (102, 104, 106, ... ; K1, K2, K3; 600) of the deterministic communication system (100; 400).

A project planning system for a deterministic communication system (100; 400) with data sources (102, 104, 106, ... ; K1, K2, K3; 600) which are connected via at least of one Switched Ethernet switch (110; 402, 404) to a data sink (114; K4), with means (118) for control of the data sources (102, 104, 106, ... ; K1, K2, K3; 600) for a planned deterministic communication from the data sources (102, 104, 106, ... ; K1, K2, K3; 600) to the data sink (114; K4), with the project-planning system being embodied for generation of data and/or program means for implementing the means for control of the data sources.

A method for operating a deterministic communication system with data sources (102, 104, 106, ... ; K1, K2, K3; 600) which are connected via at least one switch (110; 402, 404) to a data sink (114; K4), with the data sources, the at least one switch and the data sink being Switched Ethernet components, characterized in that the data sources are controlled for a planned, deterministic communication from the data sources to the data sink.

A method for operating a deterministic communication system, where the data sources are controlled so that competing communication requests from the data sources (102, 104, 106, ... ; K1, K2, K3; 600) are avoided.

A method for operating a deterministic communication system, with the data sources being controlled so that the formation of queues of communication requests from the data sources (102, 104, 106, ... ; K1, K2, K3; 600) is avoided.

A method for operating a deterministic communication system, with a communication request from one of the data sources (102, 104, 106, ... ; K1, K2, K3; 600) containing information as regards the volume of information to be transmitted overall and the overall time available for the transmission of the volume of information.

A method for operating a deterministic communication system, with the following further steps: Determination of a topology of the communication system, of characteristics of subscribers of the communication system and of time and volume requirements of application entities of the subscribers of the communication system and a generation of description data of the planned, deterministic communication based on this data.

A method for operating a deterministic communication system, with a synchronization for the planned, deterministic communication of the data sources (102, 104, 106, . . . ; K1, K2, K3; 600).

A method for operating a deterministic communication system, where the synchronization is undertaken based on a cyclic token method.

The invention claimed is:

1. A deterministic communication system, comprising:
a plurality of similarly configured data sources which can be connected via at least one switched Ethernet-switch to a data sink, the data sources each comprising (i) a first module for synchronization between data sent from the data source and data sent from said similarly configured data sources when the data source and said similarly configured data sources are connected to the switch and (ii) a second module providing a description to preconfigure data for transmission from the data source to the switch so that competing communication requests between the data source and each of said similarly configured data sources are avoided by means of planned, deterministic communication from the data source to the data sink.

2. The deterministic communication system according to claim 1, wherein one or more of the data sources are taken from the group consisting of programmable logic controllers, supervisory control and data acquisition systems, and field bus peripheral devices and wherein the data source can also function as a data sink.

3. The deterministic communication system according to claim 1, wherein the data sources and the data sink are end nodes.

4. The deterministic communication system according to claim 1, wherein a plurality of switches are arranged between the data sources and the data sink.

5. The deterministic communication system according to claim 1, wherein each of the data sources has a memory for storing description data for description of the planned, deterministic communication of the relevant data source to the data sink.

6. The deterministic communication system according to claim 1, further comprising a project-planning system for generating description data of the planned, deterministic communication.

7. The deterministic communication system according to claim 1, wherein at least one of the data sources has means for determining
    a topology of the communications system,
    characteristics of subscribers of the communication system, and
    time and volume requirements of application entities of the subscriber of the communication system for generating description data of the planned, deterministic communication on this basis.

8. The deterministic communication system according to claim 1, wherein the second module provides in the planned, deterministic communication, wherein the gaps are able to be used for additional data transmission outside the planned deterministic communication.

9. The deterministic communication system according to claim 1, further comprising a synchronization mechanism for the planned, deterministic communication of the data sources.

10. The deterministic communication system according to claim 9, wherein the synchronization mechanism is designed based on a cyclic token method.

11. The deterministic communication system according to claim 9, wherein the synchronization mechanism is based on a common, synchronous time base of the data sources.

12. The deterministic communication system according to claim 1, wherein the data sources, the switch, and the data sink are components of a Switched-Ethernet.

\* \* \* \* \*